Figure 5:
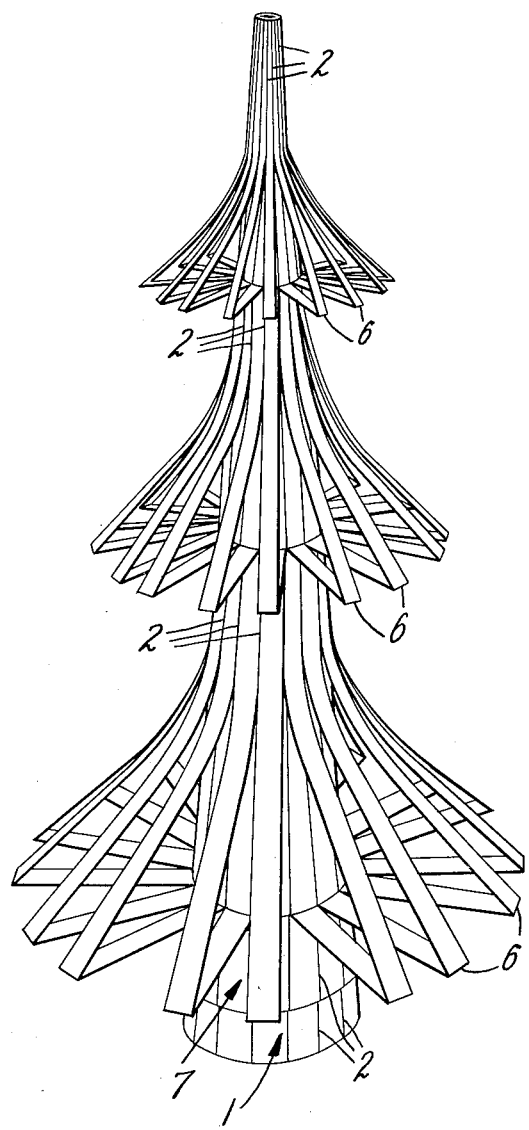

Feb. 13, 1962 J. SCHEROTTO 3,020,660
COLLAPSIBLE IMITATION TREE
Filed Nov. 30, 1959 2 Sheets-Sheet 1
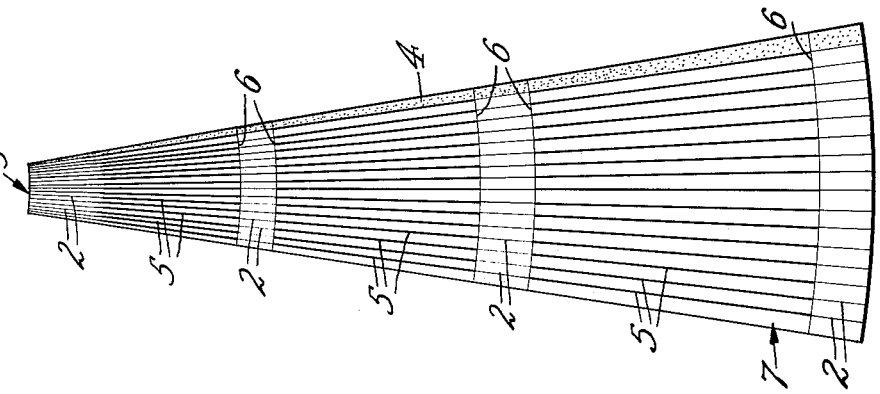
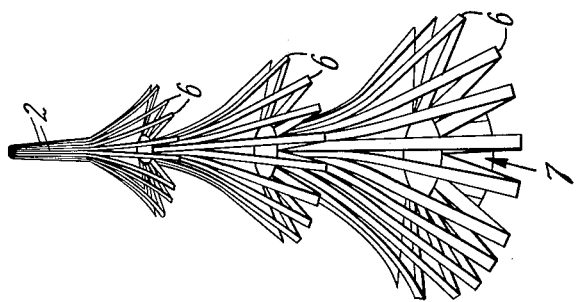
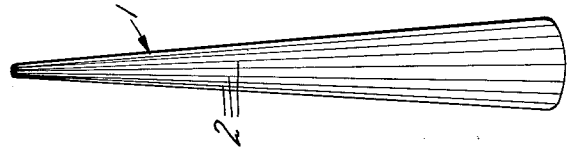
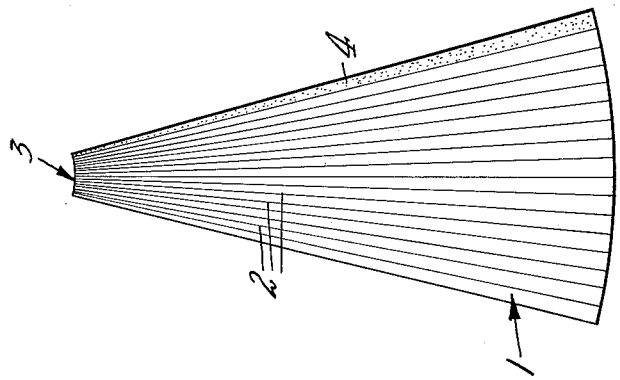
INVENTOR.
JOHN SCHEROTTO
BY
*Pennie, Edmonds, Morton, Barrows, & Taylor*
ATTORNEYS Feb. 13, 1962    J. SCHEROTTO    3,020,660
COLLAPSIBLE IMITATION TREE
Filed Nov. 30, 1959    2 Sheets-Sheet 2

INVENTOR.
JOHN SCHEROTTO
BY
Pennie, Edmonds, Morton, Barrows & Taylor
ATTORNEYS

United States Patent Office 3,020,660
Patented Feb. 13, 1962

3,020,660
COLLAPSIBLE IMITATION TREE
John Scherotto, Union City, N.J.
(353 W. 57th St., Room 320, New York, N.Y.)
Filed Nov. 30, 1959, Ser. No. 856,090
4 Claims. (Cl. 41—15)

The present invention relates to an inexpensive improved decorative novelty and more particularly is concerned with the provision of a pleasing imitation tree of any desired size and color and the method of making it.

The invention also contemplates a flat-mailable or storage novelty which may readily be made three dimensional.

Referring to the drawings:

FIGS. 1 and 2 are views of the unassembled blanks out of which are formed the inner and outer sections, respectively, of a preferred embodiment of my invention;

FIGS. 3 and 4 are perspective views, respectively, of the blanks of FIGS. 1 and 2, after they have been shaped, expanded and fastened; and FIG. 5 is a perspective view of the sections of FIGS. 3 and 4 assembled to assume the desired configuration of a tree.

Referring in detail to the drawings 1 is a flat substantially-triangular piece of rigid but flexible material of any desired color such as cardboard, foil, heavy paper, certain plastics and the like having a plurality of lengthwise score marks 2 converging at its top or apex 3 to form creases in the material when bent along the score marks. An end flap 4 is provided with glue, paste, a pressure-sensitive adhesive or any other well-known means such as clips, stitching, appropriate locking means or the like may be employed to fasten the device into the conical form shown in FIG. 3.

In FIG. 2, 7 is also a flat, substantially-triangular piece of rigid but flexible material having lengthwise score marks 2 and slits or cuts 5 in portions of the score marks 2. A plurality of transverse score marks 6 is provided in the material of FIG. 2. The lengthwise scorings 2, slits 5 and transverse score marks 6 are provided so that after the device of FIG. 2 has been shaped and fastened into conical form as shown in FIG. 4 by any appropriate well-known means as aforesaid, pressure on the top and bottom of the cone of FIG. 4 will cause the material in the vicinity of the cuts 5 to bulge outwardly and the transverse score marks or creases 6 will cause the cone to assume a form resembling tiered branches after which said cone may be telescopically mounted on the cone of FIG. 3 to simulate a tree as depicted in FIG. 5. If the material from which the device of FIG. 4 is fashioned is of sufficient rigidity to be self-supporting, use of the separate trunk member shown in FIG. 3 may be dispensed with, in which case those portions of my imitation tree which comprise scorings 2 and the surface areas immediately adjacent thereto (see FIG. 5) will themselves comprise the trunk sections of the tree.

In the preferred embodiment of the invention disclosed in the drawings, I have shown conical sections having 16 lengthwise score marks 2, and score marks 2 plus cuts 5, in addition to a pasting or fastening flap to permanently fasten the sections into conical form. More or less score marks 2 and score marks 2 plus cuts 5 may be employed or the device may be made without employing score marks 2 on either the inner or outer sections thereof without departing from the spirit of the invention. If, however, the device is to be folded flat for storing or mailing, it is obvious that an even number of scorings should be employed.

If the device is of the type which has an even number of lengthwise scores, the outer section may be removed from the inner and each section collapsed substantially flat for storage or mailing. When it is again desired to make use of the imitation tree, it may easily and readily be expanded and reshaped to again assume the form of an imitation tree.

Additionally, the tree depicted in FIG. 5 has three tiers of branches. More or fewer tiers may be formed by providing additional or less cuts or slits 5 and scorings 6.

The position of the plurality of transverse concentric score marks 6 with respect to the length of cuts 5 determines how far out the tiers of imitation branches will extend.

The tree may be of any desired size, the size being determined by the choice of size of blanks shown in FIGS. 1 and 2.

I claim:

1. A unitary, collapsible, imitation tree comprising a plurality of rigid but flexible substantially cylindrical trunk sections alternately interconnected with a plurality of rigid but flexible tiered-branches sections, each of said tiered-branches sections having a plurality of spaced, elongated strips, permanently interconnected with each other and with adjacent cylindrical trunk sections, and depending first outwardly away from trunk sections adjacent thereabove and then inwardly toward trunk sections therebelow, meeting therewith at substantially right angles.

2. A two member, collapsible, imitation tree comprising a unitary, rigid but flexible, conical inner member and a unitary, rigid but flexible, outer trunk-and-tiered-branches member adapted to be telescopically mounted upon said conical inner member, said outer, trunk-and-tiered-branches member comprising a plurality of rigid but flexible, substantially-cylindrical, trunk sections alternately interconnected with a plurality of rigid but flexible, tiered-branches sections, each of said tiered-branches sections having a plurality of spaced, elongated strips, permanently interconnected with each other and with adjacent cylindrical trunk sections and depending first outwardly away from trunk sections adjacent thereabove, and then inwardly toward trunk sections therebelow, meeting therewith at substantially right angles.

3. A unitary, collapsible tree comprising a substantially-triangular, flat, rigid but flexible sheet adapted to be erected into imitation tree form, said sheet having therein a plurality of vertically-arranged, alternately-interspersed score marks and slits forming straight lines converging toward the apex of said substantially-trianular sheet and a plurality of substantially-horizontally-arranged score marks, half of them adjacent to and on either side of the lower ends of each of said slits and the other half thereof a distance up therefrom such that when said sheet has been erected into imitation tree form said vertically-arranged, alternately-interspersed score marks and slits, and said substantially-horizontally-arranged score marks cooperate to form a plurality of permanently-interconnected, substantially-cylindrical trunk sections and tiered-branches sections, the lower portions of said tiered-branches sections meeting with trunk sections adjacent therebelow at substantially right angles.

4. A two member, collapsible, imitation tree, comprising a first, substantially-triangular, flat, rigid but flexible sheet adapted to be erected into conical form and a second, substantially-triangular, flat, rigid but flexible sheet adapted to be erected into imitation trunk-and-tiered-branches form and to be telescopically mounted over said first sheet erected into conical form, said second sheet having therein a plurality of vertically-arranged, alternately-interspersed score marks and slits forming straight lines converging toward the apex of said substantially-triangular second sheet, and a plurality of substantially-horizontally-arranged score marks, half of them adjacent to and on either side of the lower ends of each of said slits and the other half thereof up a distance therefrom such that when said second sheet has been telescopically mounted over said first sheet erected into conical form, said vertically-arranged, alternately-interspersed score marks and slits, and said substantially-horizontally-arranged score marks, cooperate to form a plurality of permanently-interconnected, substantially cylindrical trunk sections and tiered-branches sections, the lower portions of said tiered-branches sections meeting with trunk sections adjacent therebelow at substantially right angles.

References Cited in the file of this patent

UNITED STATES PATENTS

| | | |
|---|---|---|
| D. 95,468 | Van Marter | Apr. 30, 1935 |
| 2,107,459 | Weller | Feb. 8, 1938 |
| 2,112,723 | Wisoff | Mar. 29, 1938 |
| 2,172,989 | Ronci | Sept. 12, 1939 |
| 2,186,351 | Stojaneck | Jan. 9, 1940 |
| 2,732,645 | James | Jan. 31, 1956 |
| 2,826,846 | Warren | Mar. 18, 1958 |
| 2,860,439 | Johnson | Nov. 18, 1958 |
| 2,893,149 | Reece et al. | July 7, 1959 |
| 2,916,843 | Meyer | Dec. 15, 1959 |

OTHER REFERENCES

School Crafts and Projects, Book 3, page 24, Fig. 2, published by Dennison Craft, Framingham, Mass., © 1929.